United States Patent
Tagami et al.

(10) Patent No.: US 11,481,021 B2
(45) Date of Patent: Oct. 25, 2022

(54) INFORMATION PROCESSING APPARATUS AND CONTROL METHOD

(71) Applicant: Lenovo (Singapore) Pte. Ltd., Singapore (SG)

(72) Inventors: Yuta Tagami, Kanagawa (JP); Yuichiro Seto, Kanagawa (JP); Koudai Horinouchi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/386,646

(22) Filed: Jul. 28, 2021

(65) Prior Publication Data

US 2022/0083123 A1 Mar. 17, 2022

(30) Foreign Application Priority Data

Sep. 11, 2020 (JP) .............................. JP2020-152824

(51) Int. Cl.
*G06F 1/32* (2019.01)
*G06F 1/26* (2006.01)
*G06F 1/3287* (2019.01)

(52) U.S. Cl.
CPC ............ *G06F 1/3287* (2013.01); *G06F 1/266* (2013.01)

(58) Field of Classification Search
CPC ................................. G06F 1/3287; G06F 1/266
See application file for complete search history.

(56) References Cited

U.S. PATENT DOCUMENTS

| | | | |
|---|---|---|---|
| 2009/0144574 A1* | 6/2009 | Tseng | G06F 1/32 713/323 |
| 2015/0046726 A1* | 2/2015 | Yokoyama | G06F 1/3209 713/300 |

FOREIGN PATENT DOCUMENTS

| | | |
|---|---|---|
| JP | 2001-242965 A | 9/2001 |
| JP | 2004-213611 A | 7/2004 |
| JP | 2005-352897 A | 12/2005 |
| JP | 2009-187396 A | 8/2009 |
| JP | 2010-282607 A | 12/2010 |
| JP | 2012-168589 A | 9/2012 |
| JP | 2013-069027 A | 4/2013 |
| JP | 2014-048865 A | 3/2014 |
| JP | 2015-507771 A | 3/2015 |
| JP | 2017-021686 A | 1/2017 |
| JP | 2019-121382 A | 7/2019 |

* cited by examiner

*Primary Examiner* — Stefan Stoynov
(74) *Attorney, Agent, or Firm* — Osha Bergman Watanabe & Burton LLP

(57) ABSTRACT

An information processing apparatus includes: a power supply unit that supplies power to a connection terminal for connection to an external device; a communication control unit that performs data communication with an external device connected to the connection terminal; an operating state detection unit that detects a signal indicating that a controller including at least the communication control unit has entered hibernation; and a power supply control unit that stops power supply to the connection terminal when the signal indicating that the controller has entered hibernation is detected by the operating state detection unit.

11 Claims, 11 Drawing Sheets

INFORMATION PROCESSING APPARATUS AND CONTROL METHOD

CROSS-REFERENCE TO RELATED APPLICATIONS

This application claims priority to Japanese Patent Application No. 2020-152824 filed Sep. 11, 2020, the contents of which are hereby incorporated herein by reference in their entirety.

BACKGROUND

Technical Field

The present invention relates to an information processing apparatus and a control method.

Related Art

In an information processing apparatus such as a laptop PC (Personal Computer), there is known a technique for making a transition from a normal operating state to a low power consumption state by an event-driven OS (Operating System) or application (for example, see Japanese Translation of PCT International Application Publication No. 2015-507771).

For example, in Windows (registered trademark) 10, Modern Standby as such a low power consumption state is supported. In Modern Standby, executable processing is significantly reduced so that some processing can be executed in background while achieving low power consumption.

However, when an external device such as a USB (Universal Serial Bus) memory is connected to the information processing apparatus, power consumption may unexpectedly increase even in the low power consumption state such as Modern Standby described above.

SUMMARY

One or more embodiments provide an information processing apparatus and a control method that suppress increased power consumption in a low power consumption state.

One or more embodiments provide an information processing apparatus that includes: a power supply unit which supplies power to a connection terminal for connection to an external device; a communication control unit which performs data communication with an external device connected to the connection terminal; an operating state detection unit which detects a signal indicating that a controller including at least the communication control unit has entered hibernation; and a power supply control unit which stops power supply to the connection terminal when the signal indicating that the controller has entered hibernation is detected by the operating state detection unit.

The above information processing apparatus may be configured to further include: a first chassis with a display unit provided thereon; a second chassis connected to the first chassis in a manner to be rotatable relative to the first chassis; and a closed state detection unit which detects whether or not the first chassis and the second chassis are in a closed state in which the first chassis and the second chassis are overlapped with each other, wherein when the closed state is detected by the closed state detection unit and the signal indicating that the controller has entered hibernation is detected by the operating state detection unit, the power supply control unit stops the power supply to the connection terminal.

Further, the above information processing apparatus may be configured to further include a connection detection unit which detects whether a rechargeable external device is connected to the connection terminal or not, wherein when it is detected by the connection detection unit that a rechargeable external device is connected to the connection terminal, the power supply control unit continues the power supply to the connection terminal without stopping the power supply to the connection terminal.

In the above information processing apparatus, when a signal indicating that the controller is no longer in hibernation is detected by the operating state detection unit after the power supply to the connection terminal is stopped, the power supply control unit may resume the power supply to the connection terminal.

Further, in the above information processing apparatus, when either or both of the fact that the first chassis and the second chassis are no longer in the closed state and the signal indicating that the controller is no longer in hibernation are detected by the closed state detection unit and the operating state detection unit, respectively, after the power supply to the connection terminal is stopped, the power supply control unit may resume the power supply to the connection terminal.

Further, in the above information processing apparatus, after the power supply to the connection terminal is stopped, the power supply control unit may perform the power supply to the connection terminal intermittently, and resume the power supply to the connection terminal when it is detected by the connection detection unit that a rechargeable external device is connected to the connection terminal.

Further, in the above information processing apparatus, when power is supplied from an AC adapter to the information processing apparatus, the power supply control unit may continue the power supply to the connection terminal without stopping the power supply to the connection terminal.

Further, in the above information processing apparatus, when power is supplied from an AC adapter to the information processing apparatus after the power supply to the connection terminal is stopped, the power supply control unit may resume the power supply to the connection terminal.

Further, the above information processing apparatus may be such that the controller outputs a signal indicative of an operating state of the controller, and the operating state detection unit acquires the signal output from the controller, and uses the acquired signal to detect the signal indicating that the controller has entered hibernation.

Further, an information processing apparatus according to one or more embodiments includes: a first chassis with a display unit provided thereon; a second chassis connected to the first chassis in a manner to be rotatable relative to the first chassis; a closed state detection unit which detects whether or not the first chassis and the second chassis are in a closed state in which the first chassis and the second chassis are overlapped with each other; a power supply unit which supplies power to a connection terminal for connection to an external device; a communication control unit which performs data communication with an external device connected to the connection terminal; and a power supply control unit which stops power supply to the connection terminal when the closed state is detected by the closed state detection unit.

The above information processing apparatus may also be configured to further include a detection sensor which outputs a detection signal according to whether the first chassis and the second chassis are in the closed state or not, wherein the closed state detection unit acquires the detection signal output from the detection sensor to detect whether the first chassis and the second chassis are in the closed state or not based on the acquired detection signal.

Further, a control method for an information processing apparatus according to one or more embodiments includes: a step of causing a power supply unit to supply power to a connection terminal for connection to an external device; a step of causing a communication control unit to perform data communication with an external device connected to the connection terminal; a step of causing an operating state detection unit to detect a signal indicating that a controller including at least the communication control unit has entered hibernation; and a step of causing a power supply control unit to stop power supply to the connection terminal when the signal indicating that the controller has entered hibernation is detected by the operating state detection unit.

Further, a control method for an information processing apparatus according to one or more embodiments is a control method for an information processing apparatus including a first chassis with a display unit provided thereon, and a second chassis connected to the first chassis in a manner to be rotatable relative to the first chassis, the control method including: a step of causing a closed state detection unit to detect whether or not the first chassis and the second chassis are in a closed state in which the first chassis and the second chassis are overlapped with each other; a step of causing a power supply unit to supply power to a connection terminal for connection to an external device; a step of causing a communication control unit to perform data communication with an external device connected to the connection terminal; and a step of causing a power supply control unit to stop power supply to the connection terminal when the closed state is detected by the closed state detection unit.

One or more embodiments can suppress increased power consumption in a low power consumption state.

DETAILED DESCRIPTION

Embodiments of the present invention will be described in detail below with reference to the accompanying drawings.

First Embodiment

First, an outline of an information processing apparatus according to a first embodiment will be described.

Figure 1:
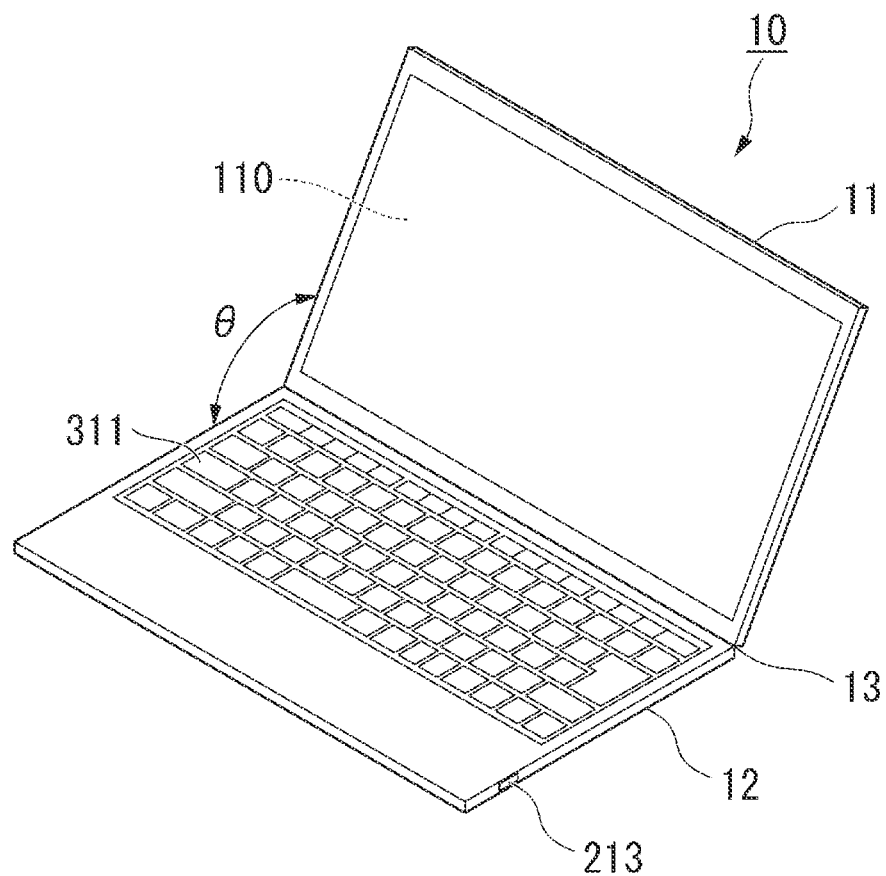
FIG. 1 is a perspective view illustrating the appearance of an information processing apparatus according to a first embodiment.

FIG. 1 is a perspective view illustrating the appearance of an information processing apparatus according to the present embodiment. An illustrated information processing apparatus is a clamshell laptop PC (Personal Computer). The information processing apparatus 10 includes a first chassis 11, a second chassis 12, and a hinge mechanism 13. The first chassis 11 and the second chassis 12 are substantially rectangular plate-shaped (for example, flat plate-shaped) chassis. One of the side faces of the first chassis 11 and one of the side faces of the second chassis 12 are combined (coupled) through the hinge mechanism 13 in such a manner that the first chassis 11 and the second chassis 12 relatively rotatable around an axis of rotation defined by the hinge mechanism 13. A state in which an open angle θ between the first chassis 11 and the second chassis 12 around the axis of rotation is approximately 0° is a state in which the first chassis 11 and the second chassis 12 are closed in a manner to be overlapped with each other (called a "closed state"). The faces of the first chassis 11 and the second chassis 12 on the face-to-face sides in the closed state are called respective "inner faces," and the faces opposite to the inner faces are called "outer faces." The open angle θ can also be considered as an angle formed by the inner face of the first chassis 11 and the inner face of the second chassis 12. A state in which the first chassis 11 and the second chassis 12 are open in contrast with the closed state is called an "open state." The open state is a state in which the first chassis 11 and the second chassis 12 are rotated relative to each other until the open angle θ becomes larger than a preset threshold value (for example, 10°).

A display unit 110 (display) is provided on the inner face of the first chassis 11. Further, a keyboard is provided as an input unit 311 on the inner face of the second chassis 12. In the closed state, the display unit 110 is made invisible and any operation on the keyboard cannot be performed. On the other hand, in the open state, the display unit 110 is made visible and operations on the keyboard are possible (namely, the information processing apparatus 10 is ready for use). Further, a USB connector 213 is provided in the second chassis 12. The USB connector 213 is a connection terminal used for connection with USB (Universal Serial Bus) compatible external devices.

For example, the information processing apparatus 10 is equipped with Windows (registered trademark) 10 as an OS (Operating System). A transition from a normal operating state to Modern Standby is made by an even-driven architecture. For example, in Windows (registered trademark) 10, the transition to Modern Standby is made by the fact that the first chassis 11 and the second chassis 12 are changed from the open state to the closed state, by the fact that a non-operation state lasts for a preset time, with an operation to make the transition to Modern Standby (for example, with an operation to a power button), and the like.

The normal operating state is a state in which, when a user operates the keyboard and the like while viewing a display screen of the display unit 110, the information processing apparatus 10 can execute processing according to the operation. For example, the normal operating state is an operating state capable of executing processing without being particularly limited, which corresponds to S0 state defined in the ACPI (Advanced Configuration and Power Interface) specification. Modern Standby is an operating state in which at least the display of the display unit 110 is turned off, which is lower in power consumption than the normal operating state. For example, Modern Standby is a state capable of executing some processing in background while achieving low power consumption by significantly reducing executable processing.

When the user does not operate the information processing apparatus 10, the information processing apparatus 10 can be caused to make the transition to Modern Standby to reduce power consumption in order to make the battery life longer. Further, in Modern Standby, packets on a communication network, input to the keyboard, connection with the USB, and the like can be monitored by continuing some processing in background to disable Modern Standby as necessary in order to make a transition to the normal operating state.

Here, when an external device (hereinafter called a "USB device") is connected to the information processing apparatus 10 by USB, power consumption may unexpectedly increase. As examples of USB devices, there are a USB-connected memory, a mouse, an HDD (Hard Disk Drive), and an SSD (Solid State Drive). When a USB device is connected, the battery life is made shorter by increasing power consumption even in Modern Standby. Therefore, in the present embodiment, control is performed to suppress the increased power consumption in Modern Standby. Specifically, the information processing apparatus 10 prevents power consumption from increasing unexpectedly by turning off VBUS for power supply to the USB device (VBUS OFF).

Figure 2A:
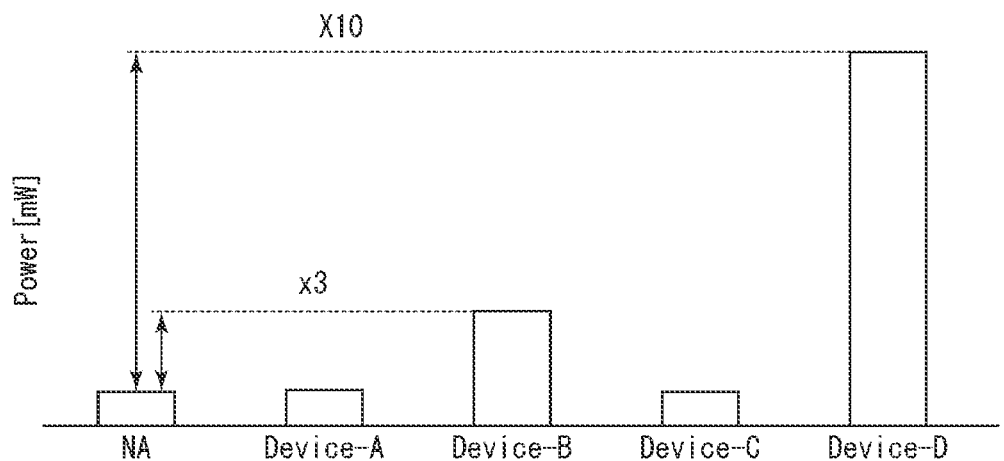
FIGS. 2A and 2B are explanatory diagrams about power consumption in Modern Standby according to the first embodiment.
Figure 2A:
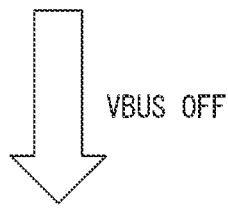
Figure 2B:
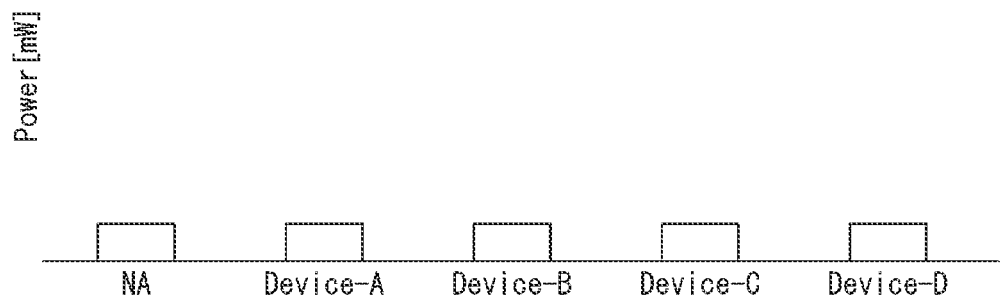

FIGS. 2A and 2B are explanatory diagrams about power consumption in Modern Standby. FIGS. 2A and 2B illustrate an example of power consumption in a state (N/A) where no USB device is connected and states where USB devices are connected in Modern Standby, respectively. Here, four types of USB devices (Device-A, Device-B, Device-C, Device-D) are illustrated as the states where USB devices are connected. FIG. 2A illustrates an example of power consumption when the VBUS is not turned off in Modern Standby. On the other hand, FIG. 2B illustrates power consumption when the VBUS is turned off in Modern Standby.

As illustrated in FIG. 2A, when the VBUS is not turned off in Modern Standby, power consumption in a state where Device-B is connected is about three times the power consumption in the state (NA) where no USB device is connected. Further, power consumption in a state where Device-D is connected is about ten times the power consumption in the state (NA). On the other hand, as illustrated in FIG. 2B, when the VBUS is turned off in Modern Standby, since power consumption in all states where USB devices are connected is the same as the power consumption in the state where no USB device is connected, no increase in power consumption is found.

Thus, the unexpected increase in power consumption can be prevented by turning off the VBUS in Modern Standby. However, when the VBUS is turned off during USB data transfer in Modern Standby, data being transferred may be lost. Further, when the VBUS is off, the information processing apparatus 10 cannot be woken up from Modern Standby by using an HID device (for example, a USB mouse) connected to USB. Therefore, in the present embodiment, the information processing apparatus 10 turns off the VBUS in a period during which no USB data transfer is performed. Further, when the first chassis 11 and the second chassis 12 are in the closed state, there is no need to wake up the information processing apparatus 10 from Modern Standby by using the USB mouse or the like. Therefore, the information processing apparatus 10 turns off the VBUS on condition of the closed state. In the following, the configuration of the information processing apparatus 10 according to the present embodiment will be described in detail.

(Configuration of Information Processing Apparatus 10)

Figure 3:
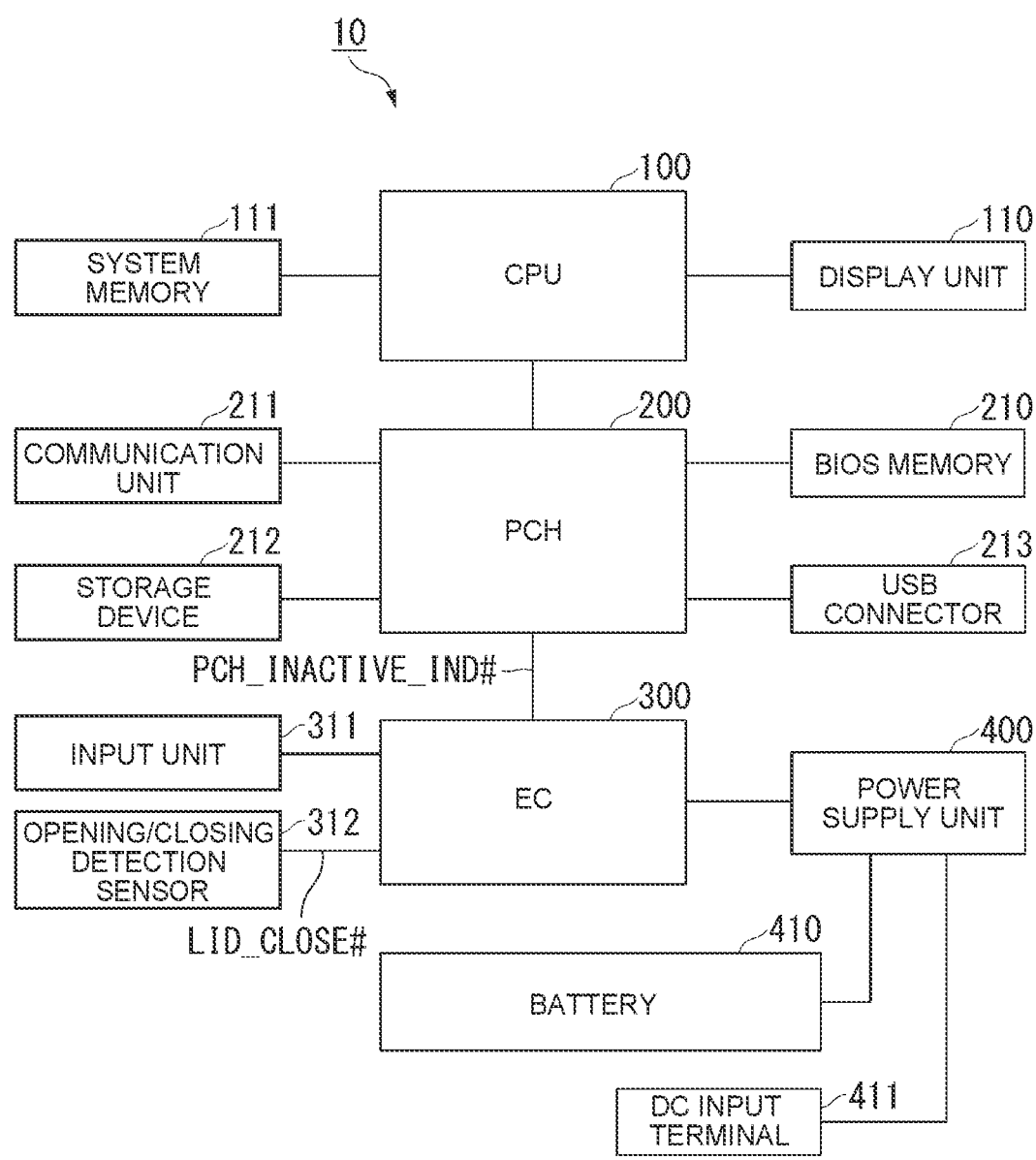
FIG. 3 is a block diagram illustrating an example of the hardware configuration of the information processing apparatus according to the first embodiment.

FIG. 3 is a block diagram illustrating an example of the hardware configuration of the information processing apparatus 10 according to the present embodiment. Note that a component corresponding to each unit in FIG. 1 is given the same reference numeral in FIG. 3. The information processing apparatus 10 illustrated in FIG. 3 includes a CPU (Central Processing Unit) 100, the display unit 110, a system memory 111, a PCH (Platform controller Hub) 200, a BIOS (Basic Input Output System) memory 210, a communication unit 211, a storage device 212, the USB connector 213, an EC (Embedded Controller) 300, the input unit 311, an opening/closing detection sensor 312, a power supply unit 400, a battery 410, and a DC input terminal 411.

The CPU 100 performs various arithmetic operations and processing by executing the OS and various programs such as applications running on the OS. Further, the CPU 100 is configured to include a GPU (Graphic Processing Unit) to execute image processing according to the various arithmetic operations and processing in order to generate display data. The CPU 100 is connected to the display unit 110 to output the generated display data to the display unit 110.

The display unit 110 is configured to include a liquid crystal display or an organic EL (Electro Luminescence) display, and the like. The display unit 110 displays a display image based on the display data output from the CPU 100.

The system memory 111 is a writable memory used as a reading area of each program executed by the CPU 100 or a working area to write processing data of the program. For example, the system memory 111 is configured to include plural DRAM (Dynamic Random Access Memory) chips. The programs include the OS, various drivers for controlling peripheral devices, various services/utilities, and application programs.

The PCH 200 includes controllers, such as USB, serial ATA (AT Attachment), an SPI (Serial Peripheral Interface) bus, a PCI (Peripheral Component Interconnect) bus, a PCI-Express bus, and an LPC (Low Pin Count) bus, and plural devices are connected to the PCH 200. For example, the CPU 100, the BIOS memory 210, the communication unit 211, the storage device 212, the USB connector 213, and the EC 300 are connected to the PCH 200.

For example, the PCH 200 outputs "PCH_INACTIVE_IND #" as a signal indicative of the operating state of the PCH 200 itself. "PCH_INACTIVE_IND #" is a signal indicating that the PCH 200 is in hibernation (hereinafter called a "sleep state"). "PCH_INACTIVE_IND #" is 3.3 V (High) when the PCH 200 is in the normal operating state, and 0 V (Low) when the PCH 200 is in the sleep state. The sleep state is a state where all but some functions are stopped, and the PCH 200 operates with power consumption lower than that in the normal operating state. Although the PCH 200 has a function to perform data communication with an external device connected to the USB connector 213, this function to perform data communication is also stopped in the sleep state.

For example, when the system makes the transition to Modern Standby to terminate data communication through the USB connector 213, the PCH 200 makes a transition to the sleep state to set "PCH_INACTIVE_IND #" to 0 V (Low). Further, even during Modern Standby, when processing by the PCH 200 is required, the PCH 200 temporarily returns to the normal operating state to set "PCH_INACTIVE_IND #" to 3.3 V (High). When "PCH_INACTIVE_IND #" is 3.3 V (High), data communication through the USB connector 213 is enabled (in practice, data communication may be performed or may not be performed).

The BIOS memory 210 is configured to include an electrically rewritable nonvolatile memory such as an EEPROM (Electrically Erasable Programmable Read Only Memory) or a flash ROM (Read Only Memory). The BIOS memory 22 stores a BIOS and system firmware for controlling the EC 300 and the like. The system firmware is firmware executed by the CPU 100.

The communication unit 211 is configured to include, for example, a communication device compatible with wired or wireless LAN, and the like. The communication unit 211 exchanges data with an external device communicably connected.

The storage device 212 is configured to include an HDD (Hard Disk Drive) or an SSD (Solid State Drive), and the like. The storage device 212 stores the OS, various drivers, various services/utilities, application programs, and various data.

The USB connector 213 is a connector used to connect USB compatible peripheral devices. For example, the USB connector 213 is a USB Type-A connector. Note that two or more USB connectors 213 may be provided, and a USB Type-C connector may be included. In the USB connector 213, a VBUS terminal for power supply, a D+ terminal and a D− terminal for data communication, and a GND terminal are provided.

The input unit 311 includes input devices such as a keyboard and a touch pad. Note that the input unit 311 may also be a touch panel to detect touch operations on the display screen of the display unit 110. The input unit 311 outputs an operation signal according to a user operation.

The opening/closing detection sensor 312 is configured to include a Hall sensor and a magnet. For example, the magnet and the Hall sensor are provided on the side of the first chassis 11 and the side of the second chassis 12, respectively, at positions corresponding to each other to output a detection signal based on a magnetic field that changes according to whether the first chassis 11 and the second chassis 12 are in the open state or the closed state. For example, the opening/closing detection sensor 312 outputs, as a detection signal, a signal "LID_CLOSE #" indicative of whether the first chassis 11 and the second chassis 12 are in the closed state or not. For example, when the state is the closed state, the opening/closing detection sensor 312 sets "LID_CLOSE #" to 0 V (Low), while when the state is not the closed state (when the state is the open state), the opening/closing detection sensor 312 sets "LID_CLOSE #" to 3.3 V (High).

The EC 300 is a one-chip microcomputer which monitors and controls various devices (peripheral devices, sensors, and the like) regardless of the system state of the OS. Further, the EC 300 has a power management function to control the power supply unit 400. Note that the EC 300 is configured to include a CPU, a ROM, a RAM, and the like, which are not illustrated, and equipped with multi-channel A/D input terminal and D/A output terminal, a timer, and digital input/output terminals. To the EC 300, the PCH 200, the input unit 311 (the keyboard and the like), the opening/closing detection sensor 312, the power supply unit 400, and the like are connected through these input/output terminals, and the EC 300 receives and transmits various signals from and to each of units connected.

For example, the EC 300 acquires an operation signal from the input unit 311 (the keyboard or the like), and transmits a control signal based on the acquired operation signal to the PCH 200 or the CPU 100. Further, the EC 300 acquires "LID_CLOSE #" output from the opening/closing detection sensor 312. Further, the EC 300 acquires "PCH_INACTIVE_IND #" output from the PCH 200. Note that the EC 300 may also acquire "PCH_INACTIVE_IND #" output from the PCH 200 through any other device (for example, a microcomputer or the like provided separately from the EC 300).

Further, the EC 300 controls the power supply unit 400 based on acquired "LID_CLOSE #" or "PCH_INACTIVE_IND #" to control on/off of the VBUS to supply power to an external device (peripheral device) connected to the USB connector 213. Here, control to turn on the VBUS corresponds to setting of the output voltage, for example, to 3.0 V as a state capable of supplying power to the external device (peripheral device). On the other hand, control to turn off the VBUS corresponds to setting of the output voltage to the GND potential (for example, 0 V) as a state of not supplying power to the external device (peripheral device).

Further, the EC 300 controls the power supply unit 400 according to the system states of the OS. The system states of the OS are the normal operating state as the most active state, Modern Standby lower in power consumption than the normal operating state, a shutdown state (power off state) in which the power supply is turned off, and the like.

The power supply unit 400 is configured to include, for example, a DC/DC converter, a charge/discharge circuit for charging/discharging the battery 410, and the like. The power supply unit 400 converts DC power supplied from the battery 410 or DC power supplied from an AC adapter connected to the DC input terminal 411 into plural voltages required to operate the information processing apparatus 10. The AC adapter is connected to the commercial power supply to convert AC power input from the commercial power supply to DC power to be input to the information processing apparatus 10, and output the converted DC power. Further, the power supply unit 400 supplies power to each unit of the information processing apparatus 10 under the control of the EC 300. For example, the power supply unit 400 controls on/off of the VBUS under the control of the EC 300.

Figure 4:
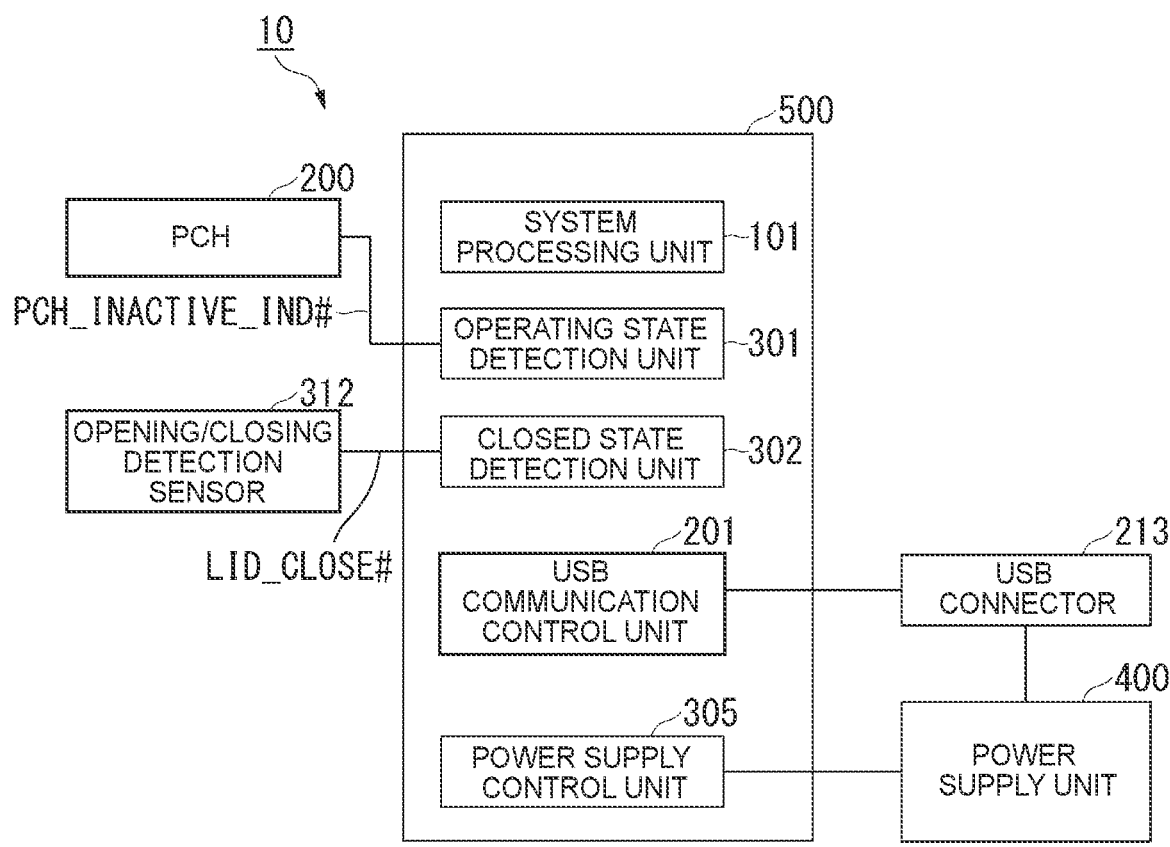
FIG. 4 is a block diagram illustrating an example of the functional configuration of the information processing apparatus according to the first embodiment.

Referring next to FIG. 4, the functional configuration of the information processing apparatus 10 related to on/off control of the VBUS according to the present embodiment will be described.

FIG. 4 is a block diagram illustrating an example of the functional configuration of the information processing apparatus 10 according to the present embodiment. The information processing apparatus 10 includes a processing unit 500 as a functional component implemented by executing programs. The processing unit 500 includes a system processing unit 101, a USB communication control unit 201 (an example of a communication control unit), an operating state detection unit 301, a closed state detection unit 302, and a power supply control unit 305 (an example of a power supply controller). For example, the system processing unit 101 is a functional component implemented by the CPU 100 executing a program. The USB communication control unit 201 is a functional component implemented by the PCH 200 executing a program. The operating state detection unit 301, the closed state detection unit 302, and the power supply control unit 305 are functional components implemented by the EC 300 executing a program.

The system processing unit 101 executes the OS or programs such as various applications running on the OS to perform system processing (various arithmetic operations and processing). Further, the system processing unit 101 causes the operating state of the system to make a transition to the normal operating state or Modern Standby by the event-driven architecture.

The USB communication control unit 201 performs data communication with an external device connected to the USB connector 213 based on the system processing by the system processing unit 101.

The operating state detection unit 301 acquires, from the PCH 200, a signal ("PCH_INACTIVE_IND #") indicative of the operating state of the PCH 200. Then, the operating state detection unit 301 uses this "PCH_INACTIVE_IND #" to detect a signal indicating that the PCH 200 has entered the sleep state. For example, when "PCH_INACTIVE_IND #" acquired from the PCH 200 is 0 V (Low), the operating state detection unit 301 detects that the PCH 200 has entered the sleep state. On the other hand, when "PCH_INACTIVE_IND #" acquired from the PCH 200 is 3.3 V (High), the operating state detection unit 301 detects that the PCH 200 is not in the sleep state (that the PCH 200 is in the normal operating state). Note that this detection enables the operating state detection unit 301 to detect whether the USB communication control unit 201 is in a state capable of performing data communication or not.

The closed state detection unit 302 detects whether the first chassis 11 and the second chassis 12 are in the closed state or not based on a detection signal ("LID_CLOSE #") output from the opening/closing detection sensor 312. For example, when "LID_CLOSE #" acquired from the opening/closing detection sensor 312 is 0 V (Low), the closed state detection unit 302 detects that the first chassis 11 and the second chassis 12 are in the closed state. On the other hand, when "LID_CLOSE #" acquired from the opening/closing detection sensor 312 is 3.3 V (High), the closed state detection unit 302 detects that the first chassis 11 and the second chassis 12 are not in the closed state (are in the open state).

The power supply control unit 305 controls the power supply unit 400 to control on/off of the VBUS. For example, when the closed state is detected by the closed state detection unit 302 (when "LID_CLOSE #" is 0 V (Low)), and it is detected that the PCH 200 has entered the sleep state (when "PCH_INACTIVE_IND #" is 0 V (Low)), the power supply control unit 305 turns off the VBUS to stop power supply to the USB connector 213.

Further, when the state detection unit 302 detects that the first chassis 11 and the second chassis 12 are no longer in the closed state ("LID_CLOSE #" is 3.3 V (High)) after the VBUS is turned off, the power supply control unit 305 turns on the VBUS to resume the power supply to the USB connector 213, or when the operating state detection unit 301 detects that the PCH 200 has changed from the sleep state to the normal operating state (when "PCH_INACTIVE_IND #" is 3.3 V (High)), the power supply control unit 305 may turn on the VBUS to resume the power supply to the USB connector 213. Alternatively, when the state detection unit 302 detects that the first chassis 11 and the second chassis 12 are no longer in the closed state after the VBUS is turned off, and it is detected that the PCH 200 has changed from the sleep state to the normal operating state, the power supply control unit 305 may turn on the VBUS to resume the power supply to the USB connector 213.

Figure 5:
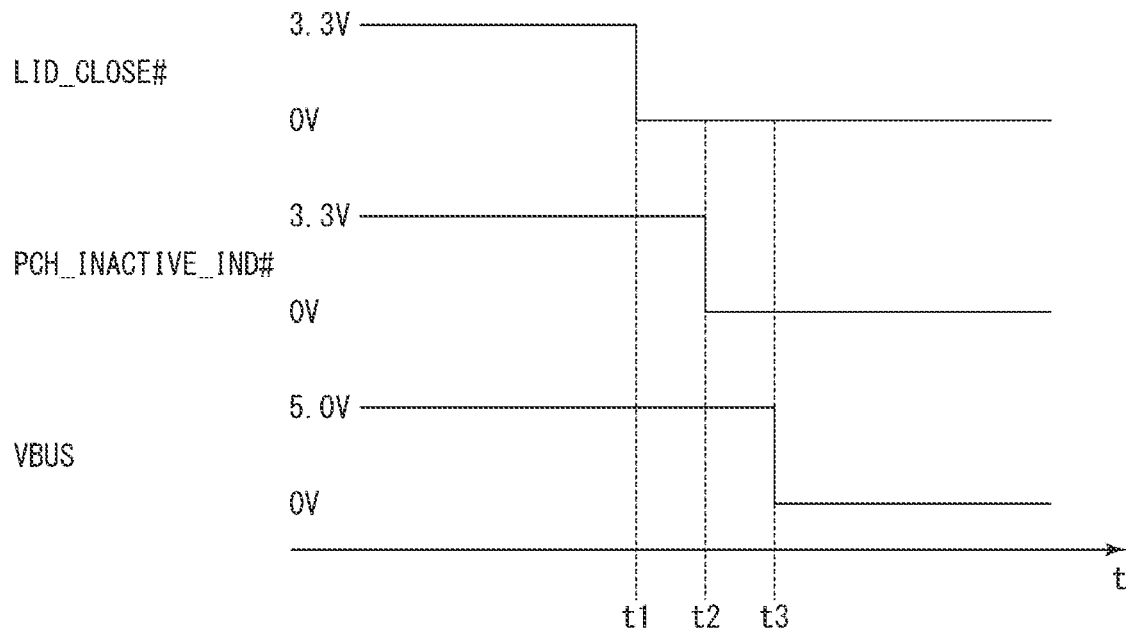
FIG. 5 is a timing chart illustrating VBUS off control according to the first embodiment.

FIG. 5 is a timing chart illustrating VBUS off control according to the present embodiment. In FIG. 5, timings of "LID_CLOSE #," "PCH_INACTIVE_IND #," and "VBUS" are illustrated by plotting time on the abscissa. For example, it is assumed that "LID_CLOSE #" changes from 3.3 V (High) to 0 V (Low) at time t1, and then "PCH_INACTIVE_IND #" changes from 3.3 V (High) to 0 V (Low) at time t2. In this case, the processing unit 500 controls to change the VBUS from on (for example, 5.0 V) to off (for example, 0 V) at time t3 on condition that both "LID_CLOSE #" and "PCH_INACTIVE_IND #" change to 0 V (Low). Note that a time lag may be set between time t2 and time t3, or no time lag may be set. Further, either the timing of "LID_CLOSE #" to change to 0 V (Low) or the timing of "PCH_INACTIVE_IND #" to change to 0 V (Low) may come first.

(Operation of VBUS Off Control Processing)

Figure 6:
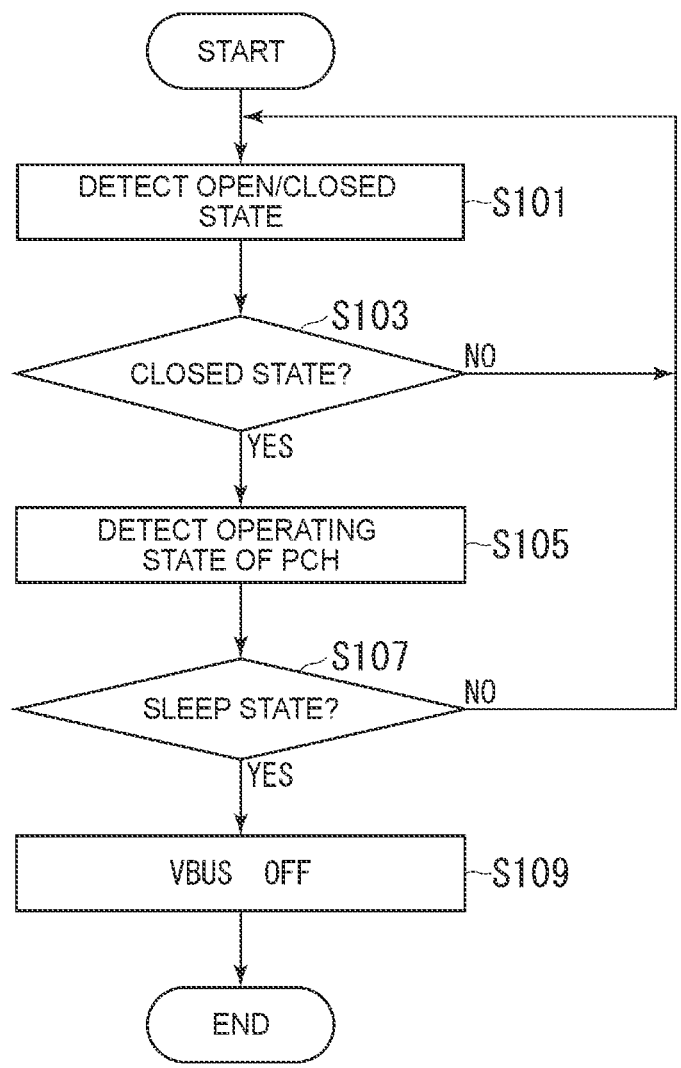
FIG. 6 is a flowchart illustrating an example of VBUS off control processing according to the first embodiment.

Referring next to FIG. 6, the operation of control processing of the processing unit 500 to turn off the VBUS will be described.

FIG. 6 is a flowchart illustrating an example of VBUS off control processing according to the present embodiment. Note that the VBUS is in the on state at the start of the processing illustrated in FIG. 6.

(Step S101) The processing unit 500 detects the open/closed state of the first chassis 11 and the second chassis 12 based on the detection signal ("LID_CLOSE #") output from the opening/closing detection sensor 312. Then, the processing unit 500 proceeds to a process in step S103.

(Step S103) Based on the detection result in step S101, the processing unit 500 determines whether the first chassis 11 and the second chassis 12 are in the closed state or not. When determining that the first chassis 11 and the second chassis 12 are not in the closed state ("LID_CLOSE #" is 3.3 V (High)) (NO), the processing unit 500 returns to the process in step S101. On the other hand, when determining that the first chassis 11 and the second chassis 12 are in the closed state ("LID_CLOSE #" is 0 V (Low)) (YES), the processing unit 500 proceeds to a process in step S105.

(Step S105) The processing unit 500 detects the operating state of the PCH 200 based on the signal ("PCH_INACTIVE_IND #") indicative of the operating state of the PCH 200. For example, when "PCH_INACTIVE_IND #" is 0 V (Low), the processing unit 500 detects that the PCH 200 has entered the sleep state. On the other hand, when "PCH_INACTIVE_IND #" is 3.3 V (High), the processing unit 500 detects that the PCH 200 has not entered the sleep state (that the PCH 200 is in the normal operating state). Then, the processing unit 500 proceeds to a process in step S107.

(Step S107) Based on the detection result in step S105, the processing unit 500 determines whether the PCH 200 has entered the sleep state or not. When determining that the PCH 200 has not entered the sleep state ("PCH_INACTIVE_IND #" is 3.3 V (High)) (NO), the processing unit 500 returns to the process in step S101. On the other hand, when determining that the PCH 200 has entered the sleep state ("PCH_INACTIVE_IND #" is 0 V (Low)) (YES), the processing unit 500 proceeds to a process in step S109.

(Step S109) The processing unit 500 turns off the VBUS to stop the power supply to the USB connector 213.

Note that the processing unit 500 may perform the processes to detect/determine whether the PCH 200 has entered the sleep state or not (step S105 and step S107) before the processes to detect/determine that the first chassis 11 and the second chassis 12 are in the closed state or not (step S101 and step S103).

(Operation of VBUS on (Return) Control Processing)

Figure 7:
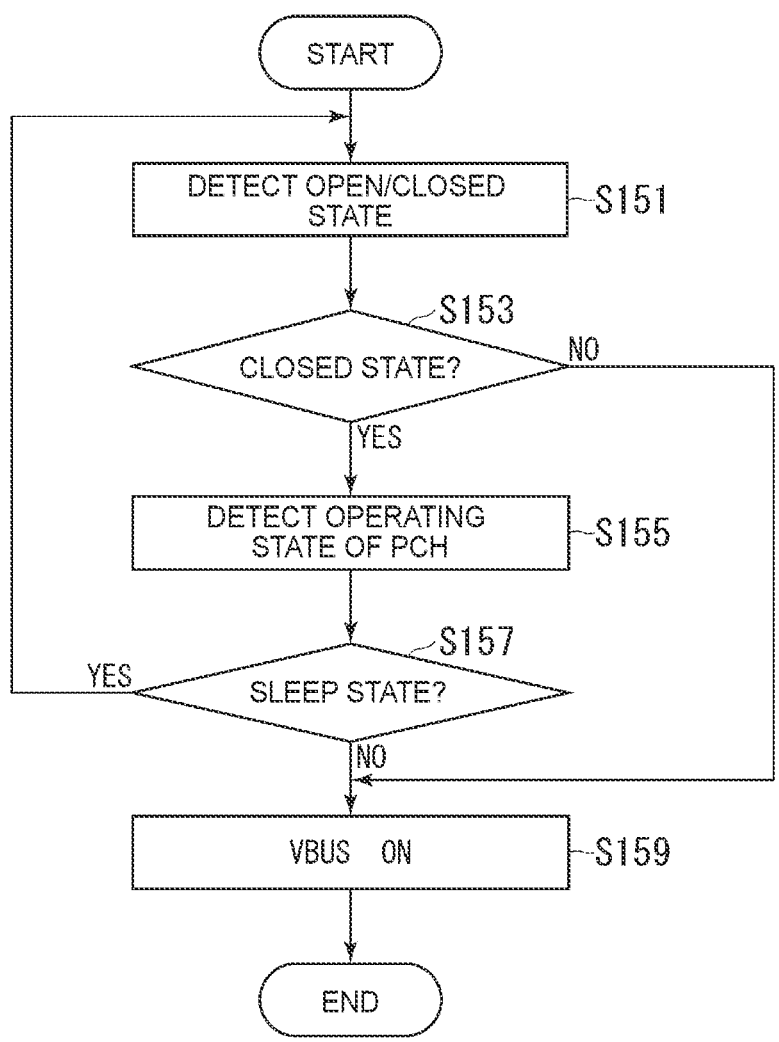
FIG. 7 is a flowchart illustrating an example of VBUS on (return) control processing according to the first embodiment.

Referring next to FIG. 7, the operation of return control processing of the processing unit 500 to turn on the VBUS again after turning off the VBUS will be described.

FIG. 7 is a flowchart illustrating an example of VBUS on (return) control processing according to the present embodiment. Note that the VBUS is turned off in the processing illustrated in FIG. 6 at the start of the processing illustrated in FIG. 7.

(Step S151) Based on the detection signal output from the opening/closing detection sensor 312, the processing unit 500 detects the open/closed state of the first chassis 11 and the second chassis 12. Then, the processing unit 500 proceeds to a process in step S153.

(Step S153) Based on the detection result in step S151, the processing unit 500 determines whether the first chassis 11 and the second chassis 12 are in the closed state or not. When determining that the first chassis 11 and the second chassis 12 are not in the closed state ("LID_CLOSE #" is 3.3 V (High)) (NO), the processing unit 500 proceeds to a process in step S159. On the other hand, when determining that the first chassis 11 and the second chassis 12 are in the closed state ("LID_CLOSE #" is 0 V (Low)) (YES), the processing unit 500 proceeds to a process in step S155.

(Step S155) The processing unit 500 detects the operating state of the PCH 200 based on the signal ("PCH_INACTIVE_IND #") indicative of the operating state of the PCH 200. For example, when "PCH_INACTIVE_IND #" is 0 V (Low), the processing unit 500 detects that the PCH 200 has entered the sleep state. On the other hand, when "PCH_INACTIVE_IND #" is 3.3 V (High), the processing unit 500 detects that the PCH 200 has not entered the sleep state (that the PCH 200 is in the normal operating state). Then, the processing unit 500 proceeds to a process in step S157.

(Step S157) Based on the detection result in step S155, the processing unit 500 determines whether the PCH 200 has entered the sleep state or not. When determining that the PCH 200 has not entered the sleep state ("PCH_INACTIVE_IND #" is 3.3 V (High)) (NO), the processing unit 500 proceeds to the process in step S159. On the other hand, when determining that the PCH 200 has entered the sleep state ("PCH_INACTIVE_IND #" is 0 V (Low)) (YES), the processing unit 500 returns to the process in step S151.

(Step S159) The processing unit 500 turns on the VBUS to resume the power supply to the USB connector 213.

Note that the processing unit 500 may perform the processes to detect/determine whether the PCH 200 has entered the sleep state or not (step S155 and step S157) before the processes to detect/determine that the first chassis 11 and the second chassis 12 are in the closed state or not (step S151 and step S153).

As described above, the information processing apparatus according to the present embodiment includes the power supply unit 400 for supplying power to the USB connector 213 (connection terminal) for connection to an external device, and the USB communication control unit 201 for performing data communication with the external device connected to the USB connector 213. The information processing apparatus 10 detects a signal indicating that the PCH 200 (an example of a controller) including at least the USB communication control unit 201 has entered the sleep state, and detects whether the first chassis 11 and the second chassis 12 are in the closed state or not. Then, when the closed state is detected and the signal indicating that the PCH 200 has entered the sleep state is detected, the information processing apparatus 10 turns off the VBUS to stop the power supply to the USB connector 213.

Thus, the information processing apparatus 10 can suppress increased power consumption in Modern Standby (a low power consumption state). At this time, since the information processing apparatus 10 turns off the VBUS after confirming that the PCH 200 has entered the sleep state (that is, that the USB communication control unit 201 is in the state incapable of performing data communication), data being transferred via USB can be prevented from being lost. Further, since the VBUS is turned off when the first chassis 11 and the second chassis 12 are in the closed state, there is no problem because there is no need to wake up the information processing apparatus 10 from Modern Standby with a USB mouse or the like even when the information processing apparatus 10 cannot be woken up.

Further, when either or both of signals indicating that the first chassis 11 and the second chassis 12 are no longer in the closed state and that PCH 200 is no longer in the sleep state are detected after stopping the power supply to the USB connector 213, the information processing apparatus 10 resumes the power supply to the USB connector 213.

Thus, the information processing apparatus 10 can turn on the VBUS to enable use of the USB when there is a possibility of using the USB after turning off the VBUS.

Second Embodiment

In the first embodiment, the example in which the information processing apparatus 10 turns off the VBUS (to stop the power supply to the USB connector 213) when detecting that the first chassis 11 and the second chassis 12 are in the closed state and detecting the signal indicating that the PCH 200 has entered the sleep state is described, but the VBUS may also be turned off (to stop the power supply to the USB connector 213) regardless of whether the first chassis 11 and the second chassis 12 are in the closed state or not. In a second embodiment, an example in which the VBUS is turned off (to stop the power supply to the USB connector 213) when the signal indicating that the PCH 200 has entered the sleep state will be described.

Figure 8:
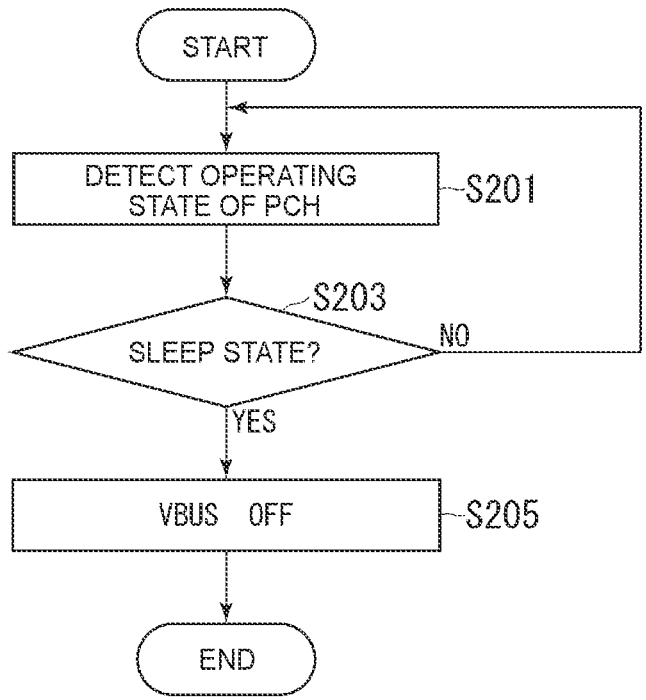
FIG. 8 is a flowchart illustrating an example of VBUS off control processing according to a second embodiment.

FIG. 8 is a flowchart illustrating an example of VBUS off control processing according to the second embodiment. Note that the VBUS is in the on state at the start of the processing illustrated in FIG. 8.

(Step S201) The processing unit 500 detects the operating state of the PCH 200 based on the signal ("PCH_INACTIVE_IND #") indicative of the operating state of the PCH 200. For example, when "PCH_INACTIVE_IND #" is 0 V (Low), the processing unit 500 detects that the PCH 200 has entered the sleep state. On the other hand, when "PCH_I-NACTIVE_IND #" is 3.3 V (High), the processing unit 500 detects that the PCH 200 has not entered the sleep state (that the PCH 200 is in the normal operating state). Then, the processing unit 500 proceeds to a process in step S203.

(Step S203) Based on the detection result in step S201, the processing unit 500 determines whether the PCH 200 has entered the sleep state or not. When determining that the PCH 200 has not entered the sleep state ("PCH_INACTIVE_IND #" is 3.3 V (High)) (NO), the processing unit 500 returns to the process in step S201. On the other hand, when determining that the PCH 200 has entered the sleep state ("PCH_INACTIVE_IND #" is 0 V (Low)) (YES), the processing unit 500 proceeds to a process in step S205.

(Step S205) The processing unit 500 turns off the VBUS to stop the power supply to the USB connector 213.

Figure 9:
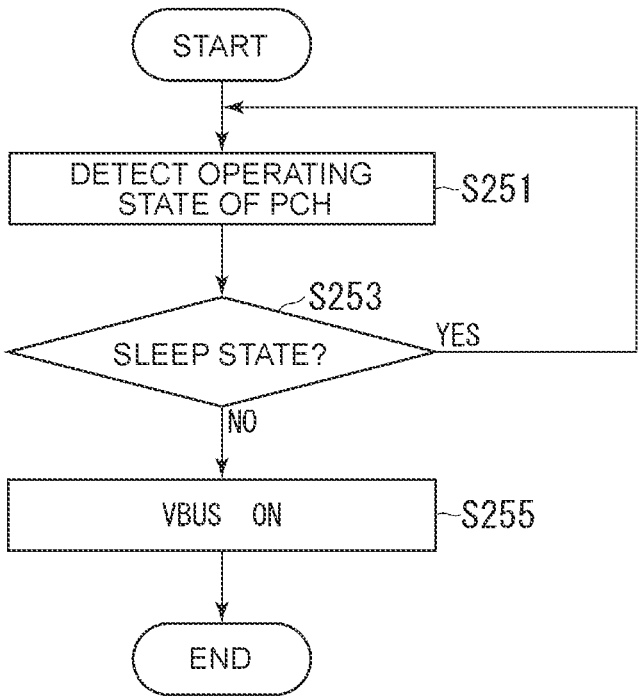
FIG. 9 is a flowchart illustrating an example of VBUS on (return) control processing according to the second embodiment.

FIG. 9 is a flowchart illustrating an example of VBUS on (return) control processing according to the present embodiment. Note that the VBUS is turned off in the processing illustrated in FIG. 8 and the VBUS is in the off state at the start of the processing illustrated in FIG. 9.

(Step S251) The processing unit 500 detects the operating state of the PCH 200 based on the signal ("PCH_INACTIVE_IND #") indicative of the operating state of the PCH 200. For example, when "PCH_INACTIVE_IND #" is 0 V (Low), the processing unit 500 detects that the PCH 200 has entered the sleep state. On the other hand, when "PCH_INACTIVE_IND #" is 3.3 V (High), the processing unit 500 detects that the PCH 200 has not entered the sleep state (that the PCH 200 is in the normal operating state). Then, the processing unit 500 proceeds to a process in step S253.

(Step S253) Based on the detection result in step S251, the processing unit 500 determines whether the PCH 200 has entered the sleep state or not. When determining that the PCH 200 has not entered the sleep state ("PCH_INACTIVE_IND #" is 3.3 V (High)) (NO), the processing unit 500 proceeds to a process in step S255. On the other hand, when determining that the PCH 200 has entered the sleep state ("PCH_INACTIVE_IND #" is 0 V (Low)) (YES), the processing unit 500 returns to the process in step S251.

(Step S255) The processing unit 500 turns on the VBUS to resume the power supply to the USB connector 213.

As described above, the information processing apparatus according to the present embodiment detects the signal indicating that the PCH 200 has entered the sleep state, and when detecting the signal indicating that the PCH 200 has entered the sleep state, the information processing apparatus 10 turns off the VBUS to stop the power supply to the USB connector 213.

Thus, the information processing apparatus 10 can suppress increased power consumption in Modern Standby (the low power consumption state). At this time, since the information processing apparatus 10 turns off the VBUS after confirming that the PCH 200 has entered the sleep state (that is, that the USB communication control unit 201 is in the state incapable of performing data communication), data being transferred via USB can be prevented from being lost. Further, in the present embodiment, since on/off of the VBUS is controlled regardless of whether the first chassis 11 and the second chassis 12 are in the closed state or not, the present embodiment can also be applied to a tablet PC or the like. In the present embodiment, since on/off of the VBUS is controlled regardless of whether the first chassis 11 and the second chassis 12 are in the closed state or not, the information processing apparatus 10 cannot be woken up from Modern Standby with the USB mouse or the like. However, the information processing apparatus 10 can be woken up from Modern Standby by using any other operation means without using the USB such as an operation to the keyboard.

Further, when detecting the signal indicating that the PCH 200 is no longer in the sleep state after stopping the power supply to the USB connector 213, the information processing apparatus 10 resumes the power supply to the USB connector 213.

Thus, the information processing apparatus 10 can turn on the VBUS to enable use of the USB when there is a possibility of using the USB after turning off the VBUS.

Third Embodiment

In a third embodiment, an example in which the VBUS is turned off (to stop the power supply to the USB connector 213) when it is detected that the first chassis 11 and the second chassis 12 are in the closed state regardless of whether the PCH 200 is in the sleep state or not will be described.

Figure 10:
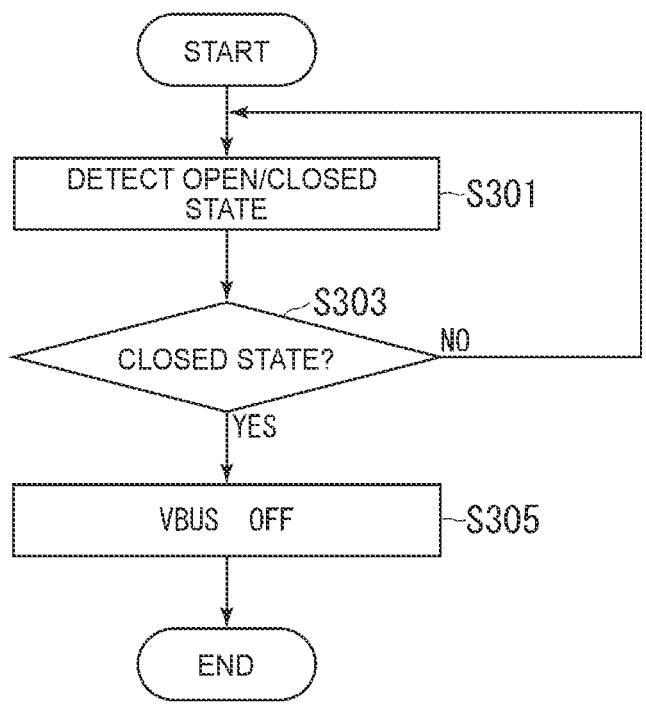
FIG. 10 is a flowchart illustrating an example of VBUS off control processing according to a third embodiment.

FIG. 10 is a flowchart illustrating an example of VBUS off control processing according to the third embodiment. Note that the VBUS is in the on state at the start of the processing illustrated in FIG. 10.

(Step S301) The processing unit 500 detects the open/closed state of the first chassis 11 and the second chassis 12 based on the detection signal output from the opening/closing detection sensor 312. Then, the processing unit 500 proceeds to a process in step S303.

(Step S303) Based on the detection result in step S301, the processing unit 500 determines whether the first chassis 11 and the second chassis 12 are in the closed state or not. When determining that the first chassis 11 and the second chassis 12 are not in the closed state ("LID_CLOSE #" is 3.3 V (High)) (NO), the processing unit 500 returns to the process in step S301. On the other hand, when determining that the first chassis 11 and the second chassis 12 are in the closed state ("LID_CLOSE #" is 0 V (Low)) (YES), the processing unit 500 proceeds to a process in step S305.

(Step S305) The processing unit 500 turns off the VBUS to stop the power supply to the USB connector 213.

Figure 11:
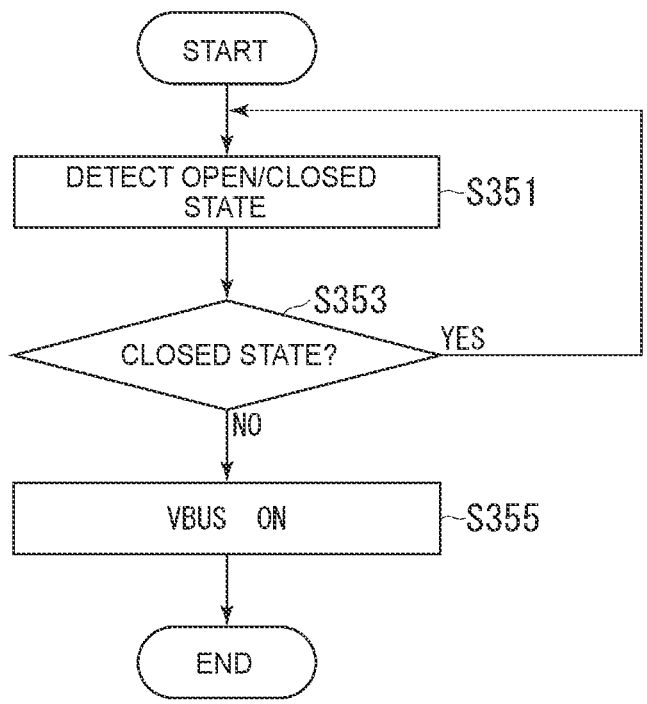
FIG. 11 is a flowchart illustrating an example of VBUS on (return) control processing according to the third embodiment.

FIG. 11 is a flowchart illustrating an example of VBUS on (return) control processing according to the present embodiment. Note that the VBUS is turned off in the processing illustrated in FIG. 10 and the VBUS is in the off state at the start of the processing illustrated in FIG. 11.

(Step S351) The processing unit 500 detects the open/closed state of the first chassis 11 and the second chassis 12 based on the detection signal output from the opening/closing detection sensor 312. Then, the processing unit 500 proceeds to a process in step S353.

(Step S353) Based on the detection result in step S351, the processing unit 500 determines whether the first chassis 11 and the second chassis 12 are in the closed state or not. When determining that the first chassis 11 and the second chassis 12 are not in the closed state ("LID_CLOSE #" is 3.3 V (High)) (NO), the processing unit 500 proceeds to a process in step S355. On the other hand, when determining that the first chassis 11 and the second chassis 12 are in the closed state ("LID_CLOSE #" is 0 V (Low)) (YES), the processing unit 500 returns to the process in step S351.

(Step S355) The processing unit 500 turns on the VBUS to resume the power supply to the USB connector 213.

As described above, the information processing apparatus according to the present embodiment detects whether the first chassis 11 and the second chassis 12 are in the closed state or not, and when detecting the closed state, the information processing apparatus 10 turns off the VBUS to stop the power supply to the USB connector 213.

Thus, the information processing apparatus 10 can suppress increased power consumption in Modern Standby (the low power consumption state). At this time, the information processing apparatus 10 turns off the VBUS without detecting that the PCH 200 has entered the sleep state (that is, that the USB communication control unit 201 is in the state incapable of performing data communication). However, there is no loss of data being transferred in the first place when no external device is connected to the USB connector 213 or when no data communication is performed.

Further, when detecting that the first chassis 11 and the second chassis 12 are no longer in the closed state after stopping the power supply to the USB connector 213, the information processing apparatus 10 resumes the power supply to the USB connector 213.

Thus, the information processing apparatus 10 can turn on the VBUS to enable use of the USB when there is a possibility of using the USB after turning off the VBUS.

Fourth Embodiment

In a fourth embodiment, control of the VBUS when a rechargeable device is connected to the USB connector 213 will be described. The rechargeable device is an external device rechargeable by power supplied from the information processing apparatus 10 by being connected to the information processing apparatus 10 via USB. When the rechargeable device is connected to the USB connector 213, the rechargeable device cannot be charged if the VBUS is turned off. In this case, the information processing apparatus 10 continues the state capable of supplying power without turning off the VBUS. This power supply is power supply necessary even during Modern Standby, which does not correspond to the unexpected increase in power consumption.

Figure 12:
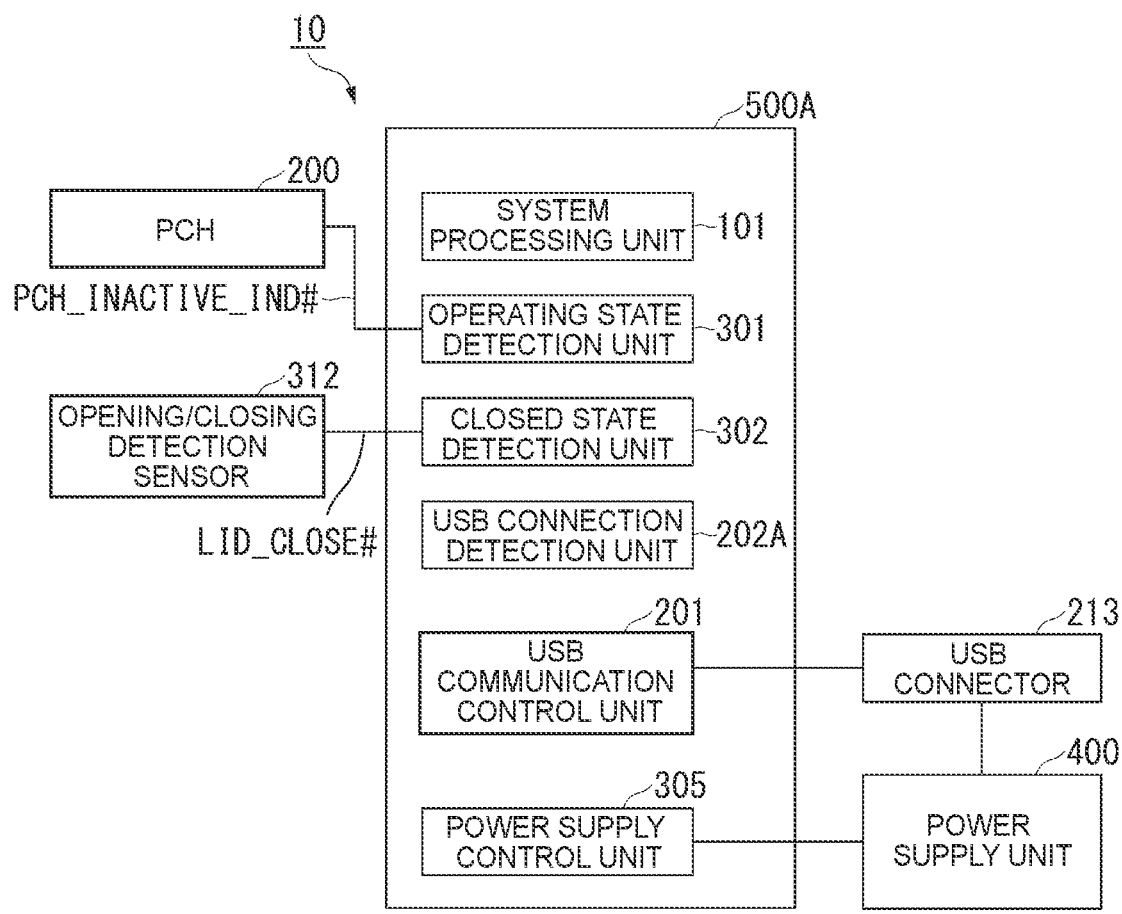
FIG. 12 is a block diagram illustrating an example of the functional configuration of an information processing apparatus according to a fourth embodiment.

FIG. 12 is a block diagram illustrating an example of the functional configuration of an information processing apparatus 10 according to the present embodiment. The information processing apparatus 10 includes a processing unit 500A as a functional component implemented by executing programs. The processing unit 500A includes the system processing unit 101, the USB communication control unit 201 (the example of the communication control unit), a USB connection detection unit 202A (an example of a connection detection unit), the operating state detection unit 301, the closed state detection unit 302, and the power supply control unit 305. Note that a component corresponding to each unit in FIG. 4 is given the same reference numeral in FIG. 12 to omit the description thereof. The processing unit 500A further includes the USB connection detection unit 202A in the configuration of the processing unit 500 illustrated in FIG. 4. For example, the USB connection detection unit 202A is a functional component implemented by the PCH 200 executing a program.

The USB connection detection unit 202A detects whether an external device is connected to the USB connector 213 or not. For example, when an external device is connected to the USB connector 213, the USB connection detection unit 202A acquires, by BIOS processing, an ID or the like of the connected external device. Further, the USB connection detection unit 202A determines whether the external device connected to the USB connector 213 is a rechargeable device or not.

When the USB connection detection unit 202A detects that a rechargeable device is connected to the USB connector 213, the power supply control unit 305 continues power supply without stopping the power supply to the USB connector 213 (the power supply control unit 305 keeps the VBUS on without turning off the VBUS).

Figure 13:
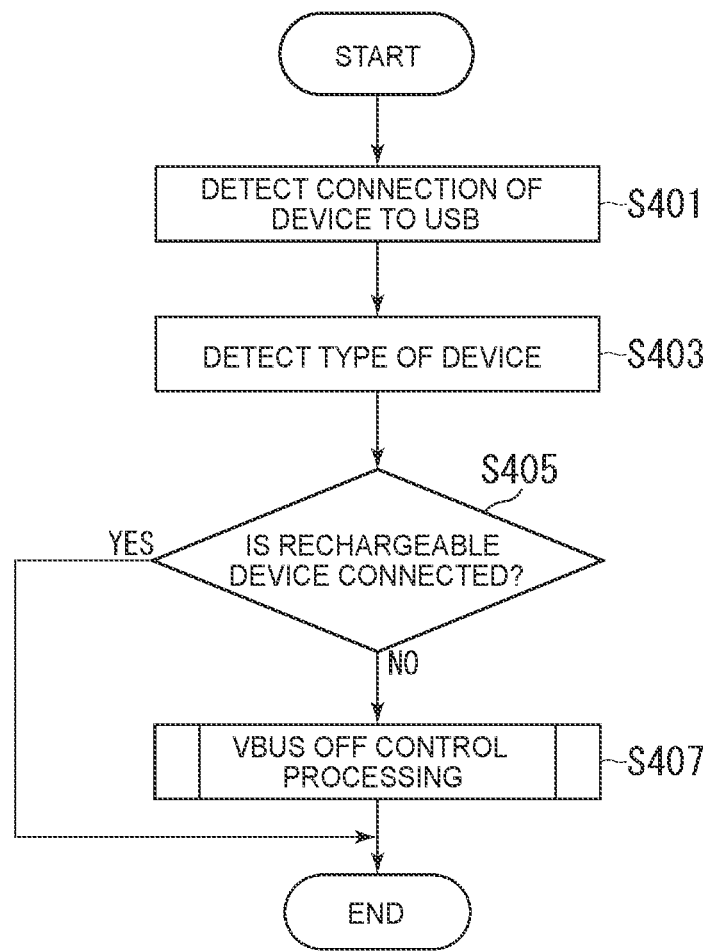
FIG. 13 is a flowchart illustrating an example of VBUS off control processing according to the fourth embodiment.

FIG. 13 is a flowchart illustrating an example of VBUS off control processing according to the present embodiment. Note that the VBUS is in the on state at the start of the processing illustrated in FIG. 13.

(Step S401) The processing unit 500A detects the connection of an external device to the USB connector 213. When detecting the connection of an external device to the USB connector 213, the processing unit 500A proceeds to a process in step S403.

(Step S403) The processing unit 500A acquires an ID or the like of the external device connected to the USB connector 213 to detect the type of the external device. Then, the processing unit 500A proceeds to a process in step S405. Note that the processes in step S401 and step S403 are executed by BIOS processing, for example, at system startup. Further, when an external device is connected to the USB connector 213 after system startup, the processes in step S401 and step S403 are executed by the BIOS processing according to the timing of being connected.

(Step S405) Based on the type of the external device detected in step S403, the processing unit 500A determines whether the external device connected to the USB connector 213 is a rechargeable device or not. When determining that the external device is a rechargeable device (YES), the processing unit 500A ends the VBUS off control processing without executing a process in step S407. On the other hand, when determining that the external device is not a rechargeable device (NO), the processing unit 500A proceeds to the process in step S407.

(Step S407) The processing unit 500A executes any of the VBUS off control processing illustrated in FIG. 6, FIG. 8, and FIG. 10.

Figure 14:
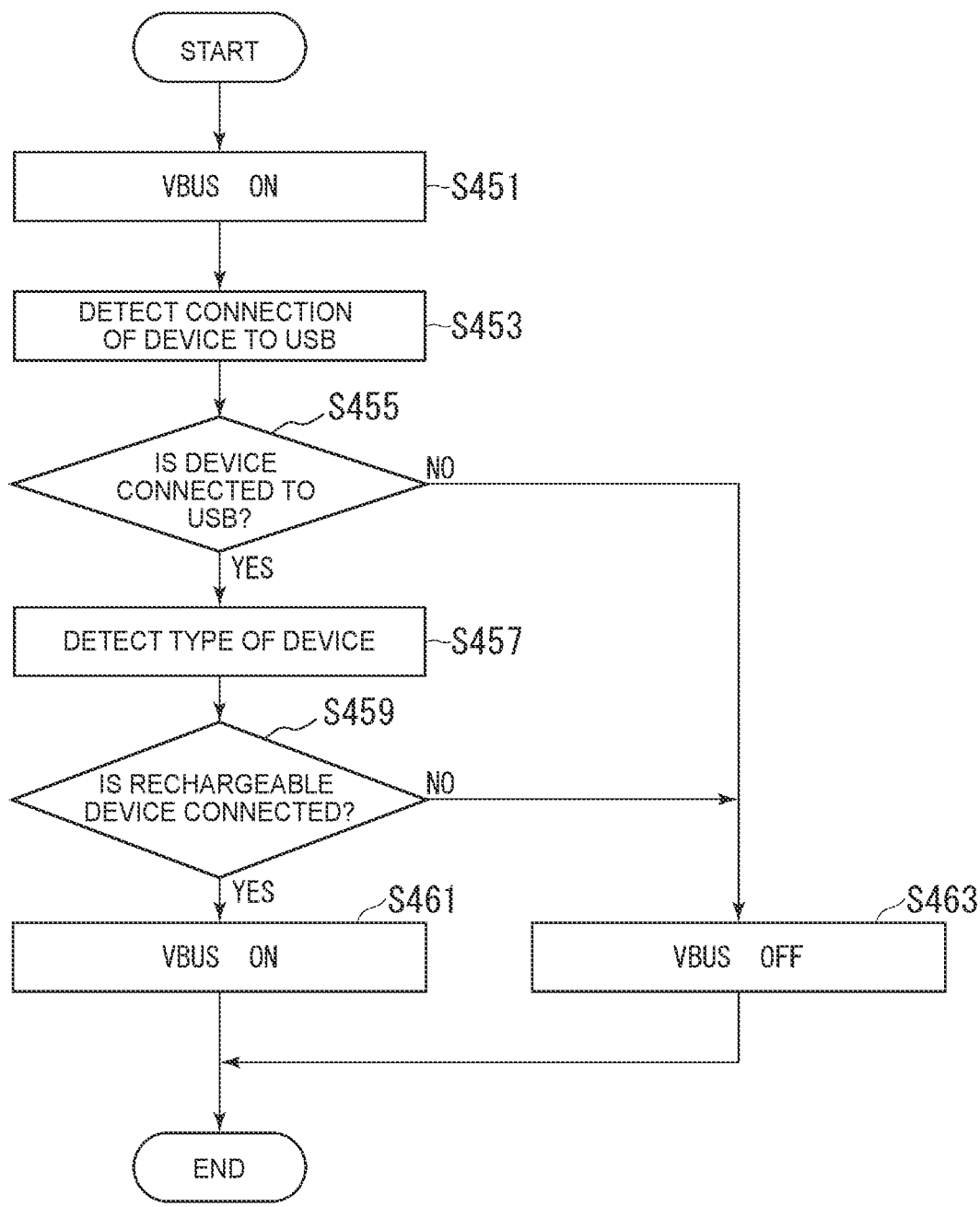
FIG. 14 is a flowchart illustrating an example of VBUS on (return) control processing according to the fourth embodiment.

FIG. 14 is a flowchart illustrating an example of VBUS on (return) control processing according to the present embodiment. Note that the VBUS is in the off state at the start of the processing illustrated in FIG. 14 because no rechargeable device is connected to the USB connector 213 in the processing illustrated in FIG. 13.

(Step S451) The processing unit 500A turns on the VBUS to supply power to an external device connected to the USB connector 213. This power supply is power supply to detect the connection of an external device to the USB connector 213. The processing unit 500A supplies power to an external device connected to the USB connector 213 temporarily for a certain period of time in an intermittent manner (for example, in a predetermined cycle).

(Step S453) The processing unit 500A detects the connection of an external device to the USB connector 213.

(Step S455) As a result of detection in step S453, the processing unit 500A determines whether the connection of an external device to the USB connector 213 is detected or not. When the connection of an external device to the USB connector 213 is not detected (NO), the processing unit 500A proceeds to a process in step S463 to return the VBUS to the off state so as to stop the power supply to the USB connector 213. On the other hand, when the connection of an external device to the USB connector 213 is detected (YES), the processing unit 500A proceeds to a process in step S457.

(Step S457) The processing unit 500A acquires an ID or the like of the external device connected to the USB connector 213 to detect the type of the external device. Then, the processing unit 500A proceeds to a process in step S459.

(Step S459) Based on the type of the external device detected in step S457, the processing unit 500A determines whether the external device connected to the USB connector 213 is a rechargeable device or not. When determining that the external device is a rechargeable device (YES), the processing unit 500A proceeds to a process in step S461. On the other hand, when determining that the external device is not a rechargeable device (NO), the processing unit 500A proceeds to the process in step S463.

(Step S461) The processing unit 500A continues (resumes) the power supply to the USB connector 213 while keeping the VBUS on.

(Step S463) The processing unit 500A returns the VBU to the off state to stop the power supply to the USB connector 213.

As described above, the information processing apparatus according to the present embodiment detects whether a rechargeable device (rechargeable external device) is connected to the USB connector 213 or not, and when it is detected by the USB connection detection unit 202A that a rechargeable device is connected to the USB connector 213, the information processing apparatus 10 continues the power supply to the USB connector 213 without turning off the VBUS to stop the power supply.

Thus, when a rechargeable device is connected to the USB connector 213, the information processing apparatus 10 enables charging of the rechargeable device, while when no rechargeable device is connected, the information processing apparatus 10 can suppress increased power consumption in Modern Standby (the low power consumption state).

Further, the information processing apparatus 10 performs the power supply to the USB connector 213 intermittently after stopping the power supply to the USB connector 213, and when it is detected that a rechargeable device is connected to the USB connector 213, the information processing apparatus 10 resumes the power supply to the USB connector 213.

Thus, even when the power supply to the USB connector 213 is stopped in Modern Standby (the low power consumption state), if a rechargeable device is connected to the USB connector 213, the information processing apparatus 10 can charge the rechargeable device.

While embodiments of the present invention have been described in detail above with reference to the accompanying drawings, the specific configurations are not limited to those described above, and various design changes and the like can be made without departing from the scope of this invention. For example, the configurations described in the respective embodiments may be combined arbitrarily.

Note that the VBUS off control processing according to the aforementioned embodiments is processing executed for the purpose of lengthening the life of the battery 410 when power is supplied from the battery 410 to the information processing apparatus 10. When power is supplied from the AC adapter to the information processing apparatus 10, since it has nothing to do with the life of the battery 410, the information processing apparatus 10 (the power supply control unit 305) does not perform control to turn off the VBUS (that is, the information processing apparatus 10 (the power supply control unit 305) continues the power supply to the USB connector 213 without stopping the power supply). Further, when power is supplied from the AC adapter to the information processing apparatus 10 after the VBUS is turned off to stop the power supply to the USB connector 213 in a state where power is supplied from the battery 410 to the information processing apparatus 10, the information processing apparatus 10 (the power supply control unit 305) resumes the power supply to the USB connector 213.

Further, in the aforementioned embodiments, the description has been made by taking Modern Standby in Windows (registered trademark) 10 as an example of the low power consumption state of the system, but the low power consumption state is not limited to this example. As for the OS and the low power consumption state of the OS, one or more embodiments can also be applied to any other OS and any other low power consumption state.

Further, each of the information processing apparatuses 10 described above has a computer system therein. Then, a program for implementing the function of each component included in the information processing apparatus 10 may be recorded on a computer-readable recording medium in such a manner that the program recorded on this recording medium is read into the computer system and executed to perform processing in each component included in the information processing apparatus 10 described above. Here, the fact that "the program recorded on this recording medium is read into the computer system and executed" includes installing the program on the computer system. Here, it is assumed that the "computer system" includes the OS and hardware such as a peripheral device and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 10, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing apparatus 10 in each of the embodiment described above may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, in each of the above-described embodiments, the example in which the information processing apparatus 10 is a laptop PC or a tablet PC is described, but the information processing apparatus 10 is not limited to a PC, and the information processing apparatus 10 may also be a smartphone, a game console, or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

Further, in the aforementioned embodiments, the example in which the Hall sensor is used to detect whether the first chassis 11 and the second chassis 12 are in the closed state or not is described, but the detection method is not limited to this example. For example, an acceleration sensor, an infrared sensor, a mechanical switch, or the like may also be used to detect whether the first chassis 11 and the second chassis 12 are in the closed state or not.

10: information processing apparatus, 11: first chassis, 12: second chassis, 13: hinge mechanism, 100: CPU, 110: display unit, 101: system processing unit, 111: system memory, 200: PCH, 201: USB communication control unit, 202A: USB connection detection unit, 210: BIOS memory, 211: communication unit, 212: storage device, 213: USB connector, 300: EC, 301: operating state detection unit, 302: closed state detection unit, 305: power supply control unit, 311: input unit, 312: opening/closing detection sensor, 400: power supply unit, 410: battery, 411: DC input terminal, 500, 500A: processing unit.

What is claimed is:

1. An information processing apparatus comprising:
   a power supply that supplies power to a connection terminal for connection to an external device; and
   one or more processors that:
   perform data communication with the external device connected to the connection terminal,
   detect a signal indicating that a controller including the one or more processors has entered hibernation, and
   upon detecting the signal indicating that the controller has entered hibernation, stop power supply to the connection terminal.

2. The information processing apparatus according to claim 1, further comprising:
   a first chassis with a display provided thereon; and
   a second chassis connected to the first chassis in a manner to be rotatable relative to the first chassis, wherein
   the one or more processors detect whether the first chassis and the second chassis are in a closed state in which the first chassis and the second chassis are overlapped with each other, and
   upon detecting the closed state and the signal indicating that the controller has entered hibernation, the one or more processors stop the power supply to the connection terminal.

3. The information processing apparatus according to claim 2, wherein upon detecting either or both of a fact that the first chassis and the second chassis are no longer in the closed state and a signal indicating that the controller is no longer in hibernation, after the power supply to the connection terminal is stopped, the one or more processors resume the power supply to the connection terminal.

4. The information processing apparatus according to claim 2, further comprising:
   a detection sensor that outputs a detection signal according to whether the first chassis and the second chassis are in the closed state,
   wherein the one or more processors acquire the detection signal output from the detection sensor to detect whether the first chassis and the second chassis are in the closed state based on the acquired detection signal.

5. The information processing apparatus according to claim 1, wherein
   the one or more processors detect whether a rechargeable external device is connected to the connection terminal,
   wherein upon detecting that the rechargeable external device is connected to the connection terminal, the one or more processors continue the power supply to the connection terminal without stopping the power supply to the connection terminal.

6. The information processing apparatus according to claim 5, wherein after the power supply to the connection terminal is stopped, the one or more processors perform the power supply to the connection terminal intermittently, and upon detecting that the rechargeable external device is connected to the connection terminal, the one or more processors resume the power supply to the connection terminal.

7. The information processing apparatus according to claim 1, wherein upon detecting a signal indicating that the controller is no longer in hibernation after the power supply to the connection terminal is stopped, the one or more processors resume the power supply to the connection terminal.

8. The information processing apparatus according to claim 1, wherein upon detecting that power is supplied from an AC adapter to the information processing apparatus, the one or more processors continue the power supply to the connection terminal without stopping the power supply to the connection terminal.

9. The information processing apparatus according to claim 1, wherein when power is supplied from an AC adapter to the information processing apparatus after the power supply to the connection terminal is stopped, the one or more processors resume the power supply to the connection terminal.

10. The information processing apparatus according to claim 1, wherein
    the controller outputs a signal indicative of an operating state of the controller, and
    the one or more processors acquire the signal output from the controller and use the acquired signal to detect the signal indicating that the controller has entered hibernation.

11. A control method for an information processing apparatus, comprising:
    causing a power supply to supply power to a connection terminal for connection to an external device; and
    causing one or more processors to:
    perform data communication with the external device connected to the connection terminal,
    detect a signal indicating that a controller including the one or more processors has entered hibernation, and
    upon detecting the signal indicating that the controller has entered hibernation, stop power supply to the connection terminal.

* * * * *